Figure 2:
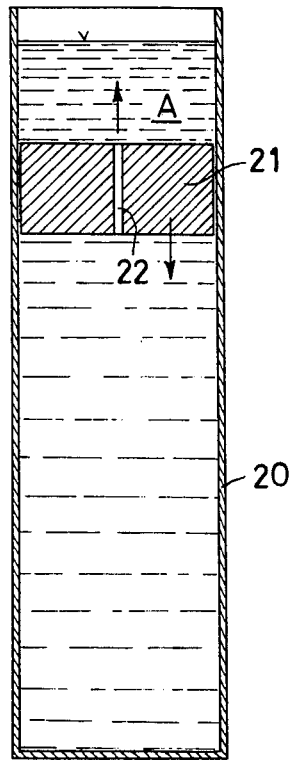

United States Patent [19]

Bonfanti

[11] 4,105,733
[45] Aug. 8, 1978

[54] METHOD FOR THE PRODUCTION OF A SYNTHETIC MATERIAL HAVING A MOTHER-OF-PEARL LOOK

[76] Inventor: Ottavio Bonfanti, Via Canova 8, Milan, Italy

[21] Appl. No.: 716,956

[22] Filed: Aug. 23, 1976

[30] Foreign Application Priority Data

May 18, 1976 [IT] Italy .............................. 23375 A/76

[51] Int. Cl.² ............................................. B29D 31/00
[52] U.S. Cl. .................................... 264/108; 264/328
[58] Field of Search ...................... 264/1, 73, 75, 108, 264/319, 323, 328; 425/542, 555, 574, 575

[56] References Cited

U.S. PATENT DOCUMENTS

| | | | |
|---|---|---|---|
| 2,280,022 | 4/1942 | Banigan et al. | 264/108 X |
| 2,696,023 | 12/1954 | Stott | 264/328 |
| 3,966,856 | 6/1976 | Williams | 264/108 X |

*Primary Examiner*—Jan H. Silbaugh
*Attorney, Agent, or Firm*—Charles E. Brown

[57] ABSTRACT

A method is disclosed for extruding a comparatively fluid material which contains particles of mother-of-pearl like particulates dispersed therein, the improvement consisting in that the extrusion is carried out through a nozzle in a variable-volume chamber, the nozzle being formed through a wall of the chamber, said wall being so movable as to have in the chamber the same volume as dispensed through the nozzle or nearly so.

5 Claims, 2 Drawing Figures

U.S. Patent    Aug. 8, 1978    4,105,733

METHOD FOR THE PRODUCTION OF A SYNTHETIC MATERIAL HAVING A MOTHER-OF-PEARL LOOK

This invention relates to the production of a plastics material having a mother-of-pearl look. More particularly, the method according to the invention is conducive to the obtention of materials having a mother-of-pearl look, in the form of sticks, starting from polymerizable organic liquids.

It is known to those skilled in the art that solid plastics materials (casein, cellulose acetate and others) are produced in the form of sticks having a mother-of-pearl look by extrusion. For example, according to a conventional method, a compound of water, plasticizers, pigments if required, casein and essence of pearl or metallic pigments in scales.

Such a homogeneous compound, having an extremely high viscosity, is caused to pass through an extruder and the thus obtained stick, which is virtually indeformable, is then placed in a bath of formaldehyde to set its dimensions while imparting thereto the properties of the so-called "galalith". Consistently with the shape of the extrusion head, the orientation of the crystals of the essence of pearl is predominantly parallel, or perpendicular to the direction of extrusion.

It is apparent that it is not possible to apply such a method to organic polymerizable liquids which are not endowed with such a viscosity as to ensure the retention of the shape of the material as the latter emerges from the extruder.

This invention aims at the principal object of shaping a material having a mother-of-pearl look by extruding a substantially fluid mass, such as metacrylate syrups and polyester resins.

The basic idea of the present invention is thus to carry out an orientation of the particles of the material which is intended to impart the mother-of-pearl look by having the fluid mass passed which contains said particles through a small diameter orifice.

The principal merit of the invention is to have envisaged a method which provides for a substantial extrusion of a material, said method being considered suitable only to materials which retain their shape as such after extrusion, making thus possible to apply such a method also to a liquid material or a material such as one capable of spontaneously taking the configuration of the vessel which contains it.

According to the invention, it is thus suggested to compress a liquid compound suceptible of being hardened, through a nozzle, in a variable-volume chamber, the volume of the chamber being varied in order to be constantly equal to the volume extruded through the nozzle, and subsequently causing the liquid mass filling said chamber to harden.

Figure 1:
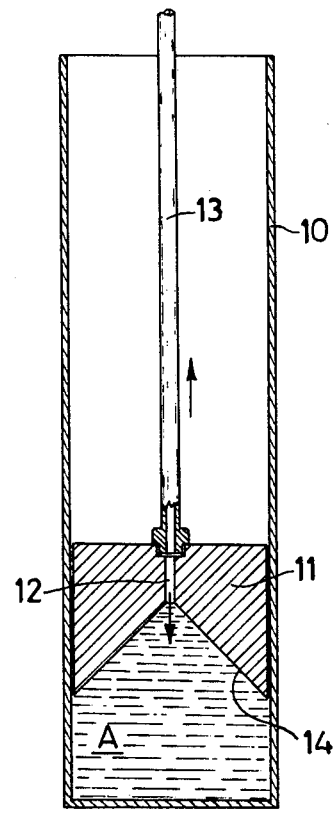

In order that the objects and features of the invention may be better understood, a few embodiments thereof will be described hereinafter, with particular reference to the accompanying drawings in which FIGS. 1 and 2 show diagrams of elementary implementations which are capable of reducing the method of the invention to practice.

As outlined above, the liquid ejected through a nozzle, which brings about the orientation of particles giving a mother-of-pearl look, is received, according to the invention, in a variable-volume chamber.

It is not desired that the liquid emerging from the nozzle has a creeping movement relative to the chamber walls since this fact would originate whirling motions within the liquid mass, which could annul to effects of the orientation. Hence, the advisability arises of varying the chamber volume by moving the chamber wall through which the nozzle has been formed.

For example, in FIG. 1 there is shown a cylindrical vessel 10, in which slides, like a piston, a body 11. The latter has a nozzle 12 formed therethrough, which is fed through a duct 13 with a plastics material in the liquid state and having scattered therein a material capable of displaying a mother-of-pearl look. Conventional pumping means of the liquid into the duct 13 have not been shown.

The nozzle 12, which is extended by a diffusion cone 14, is capable of orienting the particles of essence of pearl, more particularly co-axially with the nozzle aforesaid: the hydraulic phenomena on which such an effect is based are not described herein inasmuch as the nozzle with the diffusion cone is very much the same as that used for the extrusion of doughy materials according to the conventional art, tending to the same purpose of orienting the mother-of-pearl- simulating particles.

It is apparent that it is possible to lead a liquid through the nozzle 12 while concurrently lifting the body 11 so as to increase the volume of the chamber A, in a way which exactly corresponds to the volume dispensed through the nozzle. Such an effect, for example, can be obtained by merely allowing the body 12 to be lifted like a piston thrust by the liquid fed into the chamber A. The cylinder 10, thus filled with the fluid, can be allowed to stand, possibly in an environment having the appropriate temperature, until such time as the fluid plastics mass has attained such a consistency as to be able to be unmolded.

FIG. 2 shows another examplary embodiment of the apparatus. In this case, a cylinder 20 is filled with the liquid and a heavy body 21 having the shape of a piston is allowed to drop freely in the liquid. A nozzle 22 provides to originate a flow of liquid directed upwards. The shape of such a nozzle, that is, a bore through a thick wall, originates an orientation of the mother-of-pearl particles substantially perpendicular to the bore axis. Also such a nozzle is well known and its hydraulic properties are not discussed herein.

With the device such as in FIG. 2 is thus sufficient that the body 21 is caused to fall to the bottom so as to arrange in the vessel a liquid column in which the particles have taken the orientation which is necessary for them to display a mother-of-pearl look. The column can thus be allowed to harden prior to unmolding same. It is apparent that in this case the variable-volume chamber A has a virtual wall which is the free liquid surface.

Of course the embodiments described herein are mere examples and the shape of the vessel can be varied, this being generally cylindrical with a circular outline or any polygonal outline, the shape of the nozzle can also be varied as well as the motions for driving the piston-like body, these being mechanical, hydraulic, magnetic or merely by gravity pull.

The direction of motion of the body 21 can be reversed, that is, the body can be pulled from the bottom upwards by any pulling means.

The nozzle as such can be radial clearance between the piston and its container and thus can have an annular shape rather than being obtained through a bore formed with any desired shape and a piston.

A few practical examples of the method according to the invention will now be described, which have been performed with devices such as shown in FIGS. 1 and 2.

EXAMPLE 1

A device of the kind shown in FIG. 2 has been used. In the mold 20 which is a tube of Pyrex glass with an inside diameter of 20 millimeters and a length of 600 millimeters a mixture of the following composition is poured:

Metacrylate syrup: 97.0%
Synthetic pearl essence: 2.0%
Acetyl peroxide: 1.0%

The metacrylate syrup is obtained by heating at 60° C the metacrylate monomer in the presence of 0.2% of acetyl peroxide. The final viscosity was 800 cps at 20° C.

The filled mold was placed in a water bath at 45° C. After one hour an extruder head 21 formed by a steel cylinder having a diameter of 19 millimeters and a length of 20 millimeters and with a central bore having a diameter of 8 millimeters, was allowed to drop in the Pyrex tube. After 10 minutes approximately the bored cylinder had reached the bottom of the tube and after 12 hours the mold was removed from the bath and a stick of slidified metacrylate polymer was removed from the mold and cut into disks having a thickness of 6 millimeters. These disks had a very attractive mother-of-pearl lustre in the core portion which is defined by the technicians as the "pearl heart". Unmolding of stick is facilitated by treating the mold walls with a mold release agent.

EXAMPLE 2

A device of the kind shown in FIG. 2 has been shown, all the other conditions being as in Example 1. A bored cylinder had been placed on the bottom of the Pyrex tube prior to filling with the metacrylate syrup, the cylinder being hung to a steel cable which emerged from the open top end of the tube.

After a stay of one hour in the bath at 45° C, the bored cylinder was withdrawn from the Pyrex tube by the agency of the steel cable. Also in this case the motion of the cylinder in the liquid mass brought about flow lines which oriented the crystal of essence of pearl along planes which were substantially perpendicular to the direction of the motion, a stick being obtained which exhibited properties akin to those of the stick as obtained in Example 1.

EXAMPLE 3

In a mold formed by a hollow stainless steel rolled section having a square cross-sectional outline and with either end closed, and having the following dimensions:

O.D. 30 by 30 millimeters
I.D. 28 by 28 millimeters
Length 800 millimeters the following compound was poured:

Polyester resin: 94%
Cobalt naphthenate, 1% Co: 1%
Methylethylketone peroxide: 2%
Pearl essence 3%.

Immediately upon filling the mould, an extruder head was dropped therein, which was a stainless parallelepiped having a base of 27 by 27 millimeters, a height of 30 millimeters and in which, by machining, a through-hollow-cross had been formed, its arms being 10 millimeter long and 3 millimeter wide.

After 10 hours at room temperature of 26° C, a polyester resin square stick was removed from the mold, the stick showing, when cut perpendicularly to its long axis, a very clear mother-of-pearl cross pattern in exact correspondence with the hollow space of the extruder head.

EXAMPLE 4

Under very much the same conditions as in example 3, with the exception that, as in example 2, the stainless steel prism had been removed from the mold by means of a steel cable rather than allowed to drop and also the as obtained stick had the same characteristics.

EXAMPLE 5

Under very much the same conditions as in examples 1 and 2 with the exception that the mold had been filled with two compounds, one containing a red iridescent essence of pearl and the other a green iridescent essence of pearl. The filling was carried out by allowing the two mixtures to flow into two discrete rivulets so as to prevent them from becoming intimately admixed together. The final result was an effect of pearl heart which was especially attractive due to the iridescent green and red glow.

EXAMPLE 6

Under very much the same conditions as in examples 3 and 4 with the exception that:

(1) the mold had an ABS resin hollow section.
(2) the mold had been filled with two different compounds according to the procedure as disclosed in example 5, one compound being identical to that of example 3 and the other as follows:

polyester resin 96%
Cobalt naphthenate, 1% Co 1%
Methylketone peroxide 2%
Black pigment in paste 1%.

EXAMPLE 7

Through a mold identical with that disclosed in example 1 and containing a compound identical to that of example 3 there had been caused to pass with the procedure described in examples 1 and 2 an object of steel having a symmetrical ovoidal shape with its ends tapered and with a maximum diameter of 19 millimeters, and a length of 30 millimeters. The polymerizable organic liquid has been forced to stay between the Pyrex tube and the ovoidal object which travelled along the tube length. The polyester stick had been withdrawn from the mold in a condition of advanced gelling and cut lengthwise with a blade. The general orientation of the crystals of essence of pearl was parallel to the axis of the cylindrical stick.

EXAMPLE 8

This example emphasizes the versatility of the present invention. The mold was a tube having an oval section the two axes of which were 120 millimeters and 60 millimeters and the length 700 millimeters.

The extruder head was a body having an oval section the two axes of which were 119 mm and 59 mm and the length 80 millimeters. Through the body there had been formed 4 through bores arranged crosswise and having a diameter of 4 millimeters. The oval stick as cut showed in the inside four mother-of-pearl eyes which were particularly brilliant embedded in an opaline mass.

It will become clear to those skilled in the art that this invention can be applied to any organic polymerizable liquid such as methyl metacrylate, styrene, polyester resins, acrylic acid esters, allylphthalate and others, as well as to mixtures of said monomers, irrespective of the fact that they have been supplemented with essence of pearl, either natural or synthetic, or with metallic pigments and not in the form of orientable scales. Obviously the invention can be applied to any geometrical cross-section.

It is apparent that the mother-of-pearl effect which can be obtained is a function of three basic conditions:
  size of the nozzle (s)
  speed at which the nozzle carrier is displaced in the liquid mass
  Viscosity of the polymerizable organic liquid.

According to the type of flow which is obtained, the mother-of-pearl effect will be even or marbled and both effected are attractive even if the even type is the most commercialized and the invention insists specially on the fact that even effects with predetermined patterns can be obtained.

In order that uniform effects may be achieved, it is necessary to obtain a balance of the three variables enumerated above.

In the field practice the lesser dimension of the nozzle cavity(ies) is in the order of one tenth of a millimeter.

It is obvious that through bores or slits of so reduced a size only liquids having a comparatively low viscosity can be allowed to flow and that the motion of the nozzle carrier can only be slow, unless in the cases in which mother-of-pearl effects of the marbled or random type are expected.

The major dimension, instead can be near the internal dimension of the mold. The limit is clearly defined, for example, by the motion of a cylindrical stock having a diameter near the I.D. of the cylindrical mold and with a comparatively reduced wall thickness.

The practicable viscosity field is from 50 centipoises to 35,000 centipoises. Below the lower limit the retention of the orientation of the essence of pearl is extremely poor so that it is difficult to retain the essence crystals oriented during the time which is required for attaining a hugh viscosity or the gelled condition for setting their position.

Above 35,000 centipoises the working conditions become nearly prohibitive unless so high pressures are impressed as to obtain the flow through the nozzle, or high forces are used to move the nozzle carrier through the liquid. The flow speed or relative motion of the nozzle carrier within the liquid can be varied from a minimum of 0.5 to a maximum of 1,200 centimeters a minute. Below the limit, the speeds are too poor to be practical and above the limits random mother-of-pearl effects are nearly exclusively obtained.

What I claim is:

1. A method for obtaining a bar-like product with a mother-of-pearl look from a hardenable mixture of a fluid synthetic material having a viscosity between 50 and 35,000 centipoises and of a further material for displaying a mother-of-pearl look when oriented in a preferential direction within the synthetic material, said method comprising the steps of:
  (a) providing a vessel having disposed therein a movable wall with the movable wall and a portion of the vessel in combination defining a variable volume mixture receiving chamber;
  (b) passing the hardenable mixture through a restricted orifice through the movable wall of the mixture receiving chamber while continuously moving the wall to progressively increase the volume of the chamber at a speed which is chosen between 0.5 and 1.200 cm/min and is directly related to the flow speed of the mixture through the restricted orifice to maintain the increasing volume of the chamber substantially equal to the volume of the dispensed mixture;
  (c) hardening the dispensed mixture in the chamber to a viscosity at which the mixture maintains its own shape;
  (d) removing the hardened mixture from the chamber.

2. The method of claim 1 wherein the mixture is placed in an open top mold forming the vessel, a piston defining the moving wall is placed in the mold above the mixture and the piston is moved down in the mold with the mixture flowing through the flow passageway in the piston, and that portion of the mold above the piston forming the mixture receiving chamber.

3. The method of claim 2 wherein the piston is a heavy body and movement thereof is a falling movement effected solely by gravity.

4. The method of claim 1 wherein a mold is provided and the mold has therein a fitted piston defining the movable wall seated in the bottom of the mold, and the mixture is flowed into the mold through the flow passageway with the portion of the mold below the piston forming the mixture receiving chamber and the piston being moved by the mixture flowing into the chamber.

5. The method of claim 4 wherein the piston discharges the mixture into the chamber with an expanding nozzle discharge effect.

* * * * *